US005543816A

United States Patent [19]
Heacock

[11] Patent Number: 5,543,816
[45] Date of Patent: Aug. 6, 1996

[54] HEAD MOUNTED DISPLAY SYSTEM WITH ASPHERIC OPTICS

[75] Inventor: Gregory L. Heacock, Camas, Wash.

[73] Assignee: Virtual Vision, Redmond, Wash.

[21] Appl. No.: 155,429

[22] Filed: Nov. 19, 1993

Related U.S. Application Data

[63] Continuation-in-part of Ser. No. 133,521, Oct. 7, 1993.

[51] Int. Cl.⁶ ........................................... G09G 3/02
[52] U.S. Cl. ...................... 345/8; 348/53; 359/630
[58] Field of Search ............... 345/9, 8, 10; 348/53, 348/51, 52; 359/708, 630, 631, 632, 633, 565, 652, 654, 721

[56] References Cited

U.S. PATENT DOCUMENTS

| | | | |
|---|---|---|---|
| 3,592,525 | 7/1971 | Schultz | 359/481 |
| 4,222,036 | 9/1980 | Troukens | 345/7 |
| 4,637,697 | 1/1987 | Freeman | 359/565 |
| 4,695,129 | 9/1987 | Faessen et al. | 345/8 |
| 4,869,575 | 9/1989 | Kubik | 345/8 |
| 4,895,439 | 1/1990 | Stoller | 359/708 |
| 4,950,057 | 8/1990 | Shirayanogi | 359/721 |
| 5,034,809 | 7/1991 | Katoh | 348/53 |
| 5,334,991 | 8/1994 | Wells et al. | 345/8 |
| 5,347,400 | 9/1994 | Hunter | 345/7 |
| 5,436,763 | 7/1995 | Chen et al. | 345/7 |

FOREIGN PATENT DOCUMENTS

60-151128  8/1984  Japan ..................... 359/721

*Primary Examiner*—Richard Hjerpe
*Assistant Examiner*—Lun-Yi Lao
*Attorney, Agent, or Firm*—McAndrews, Held & Malloy, Ltd.

[57] ABSTRACT

A binocular head mounted display system is shown utilizing an aspheric lens in each of the user's right-eye and left-eye optical paths. The aspheric lens is formed with a number of concentric zones for controlling the distance at which an image of displayed information is projected from the user and to minimize distortions across the virtual image. The distance between each lens and its respective display is independently variable. Further, the distance between the optical system as a whole and the user's eyes is variable.

38 Claims, 5 Drawing Sheets

HEAD MOUNTED DISPLAY SYSTEM WITH ASPHERIC OPTICS

This is a continuation-in-part of U.S. patent application Ser. No. 08/133,521 filed Oct. 7, 1993.

TECHNICAL FIELD

The present invention is directed to a head mounted display system and more particularly to a head mounted display system that employs a compact, optical system with an aspheric lens for minimizing distortions across the virtual image projected by the system.

BACKGROUND OF THE INVENTION

Head mounted display systems are known that include a lens disposed between an eye of the user and the face of a display for projecting an enlarged virtual image of the displayed information. These systems, however, typically employ a lens with a simple curvature such as a spherical lens. The virtual image that results with the use of a spherical lens has a number of distortions, including variations in the magnification and field of curvature across the image as well as edge distortions such as barrel distortion. In order to compensate for such distortions compensating lenses and the like are typically added to the optical system. These additional optics, however, increase the weight and overall size of the optical system. It is important to minimize the weight and size of the optical system for a head mounted display unit, otherwise the unit is too heavy and cumbersome to be comfortably supported on a user's head.

SUMMARY OF THE INVENTION

In accordance with the present invention, the disadvantages of prior head mounted display systems have been overcome. The head mounted display system of the present invention utilizes an aspheric lens that controls the distance from the user at which the virtual image appears and that further substantially eliminates distortions across the virtual image.

More particularly, the head mounted display system of the present invention includes a support to mount the display system on a user's head. An image source is mounted on the support to provide video information. The aspheric lens is mounted on the support relative to the image source to allow a user to view, through the aspheric lens, an enlarged image of the video with the image being projected at a distance from the user. The aspheric lens has a surface shaped with a number of concentric zones that includes an inner-zone for substantially controlling the distance from the user at which the virtual image appears and one or more zones located outside of the inner-zone to minimize distortions across the virtual image. In one embodiment, a mid-zone minimizes variations in magnification and field of curvature across the virtual image and an outer-zone minimizes distortions about the edges of the virtual image.

The aspheric lens may include a single aspheric surface as described above. Alternatively, the aspheric lens may be biaspheric, including an aspheric entrance surface and an aspheric exit surface. Further, the aspheric lens may be formed of at least two materials having different indices of refraction so as to form an achromat to compensate for chromatic aberrations.

The aspheric lens, in accordance with the present invention, may be utilized in a monocular head mounted display system. Alternatively, two aspheric lenses, one associated with the user's right eye and one associated with the user's left eye, may be employed with a single display or a pair of displays or image sources so as to provide a binocular head mounted display system.

The aspheric lens and display are mounted on the support such that the lens is substantially parallel to the face of the display, wherein a central axis of the lens extends perpendicular to the face of the display. For systems in which the virtual image is to appear at a distance from the user that is less than infinity, the aspheric lens and display are mounted on the support at a convergence angle with respect to the axis of a user's eye when looking straight ahead. The lens and display are at a convergence angle with respect to the user's eye to direct the user's eye inward at an angle that is natural for a user viewing an object at a distance that is less than infinity.

The aspheric lens and display are further mounted on the support relative to one another such that the distance between the lens and display is variable. For a binocular head mounted display system, the distance between the right-eye lens and display and the distance between the left-eye lens and display are independently variable. Because the distances between the lens and display are independently variable for the user's right and left eye, the distance of each lens may be set by a particular user so as to accommodate for refractive error in user's that are nearsighted or far-sighted. Thus, the head mounted display system of the present invention may be worn by a user who normally wears corrective eyewear, without that eyewear.

Further, in order to compensate for variations in the interpupillary distance of various users, the support on which the optics and display(s) are mounted is movable with respect to the user's face to allow a user to vary the distance between the user's eyes and respective lenses together.

These and other objects, advantages and novel features of the present invention, as well as details of an illustrative embodiment thereof, will be more fully understood from the following description and the drawing.

DESCRIPTION OF THE PREFERRED EMBODIMENT

The head mounted display unit 10 of the present invention, as shown in FIGS. 1–4, includes a frame 12 having a support 14 for the optical system. The support 14 includes a front cover 15 and is adjustably mounted on a pair of temples 16 and 18. The optical system of the head mounted display unit 10 includes a right-eye aspheric lens 20 and a left-eye aspheric lens 22 into which a user looks to view an enlarged virtual image of the video information depicted on respective displays 24 and 26 where the virtual image appears at a distance from the user that is greater than the actual distance of the display from the user. The displays 24 and 26 may be liquid crystal displays or the like which are mounted on the support 14 such that the face 25, 27 of each display 24, 26 is aligned with a respective aperture 29, 31 in the support 14 with the face 25, 27 of each display 24, 26 being directed towards the user.

The frame 12 also supports drive electronics for the displays 24 and 26, as well as for a pair of earphones 33 and 35. As is well known, the drive electronics for the displays are responsive to standard video input signals to drive the displays to depict video information. To reduce the weight of the head mounted display unit 10 and to allow the head mounted display unit 10 to provide a universal video display that may receive video inputs from any one of a number of sources, the video input signal generator is preferably a separate, remote unit.

The video input signal generator may take the form of a television tuner, video camera, video player, video game, computer, or other device that generates a video input signal. In particular, the displays 24 and 26 may be driven to provide a stereoscopic virtual image, as is well known. The head mounted display system 10 may be coupled to the video input signal generator and/or audio generator by a cable or the like; however, the unit 10 need not be physically connected to the video/audio input signal generator. For example, the video and audio input signals may be RF modulated and transmitted from the remote unit to a head mounted display unit 10 that includes an RF receiver, as described in detailed in U.S. patent application Ser. No. 07/986,422, filed Dec. 4, 1992, assigned to the Assignee of the present invention and incorporated herein by reference.

Figure 6:
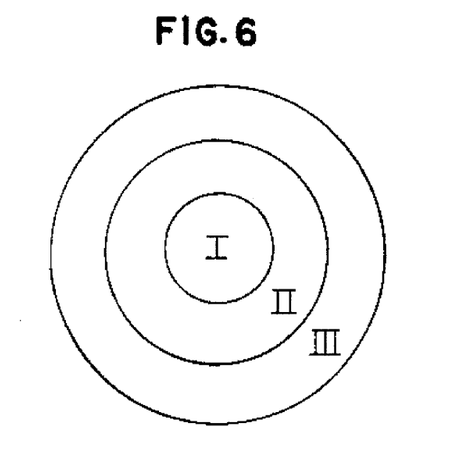
FIG. 6 is a schematic illustration of an aspheric lens with three concentric zones.
Figure 7A:
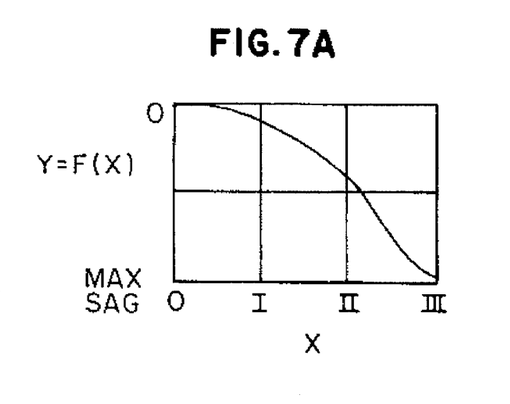
FIGS. 7A and 7B are graphs illustrating how one aspheric surface of the lens varies with X.
Figure 7B:
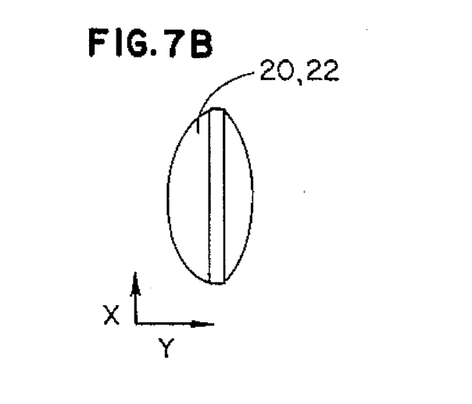
Figure 8:
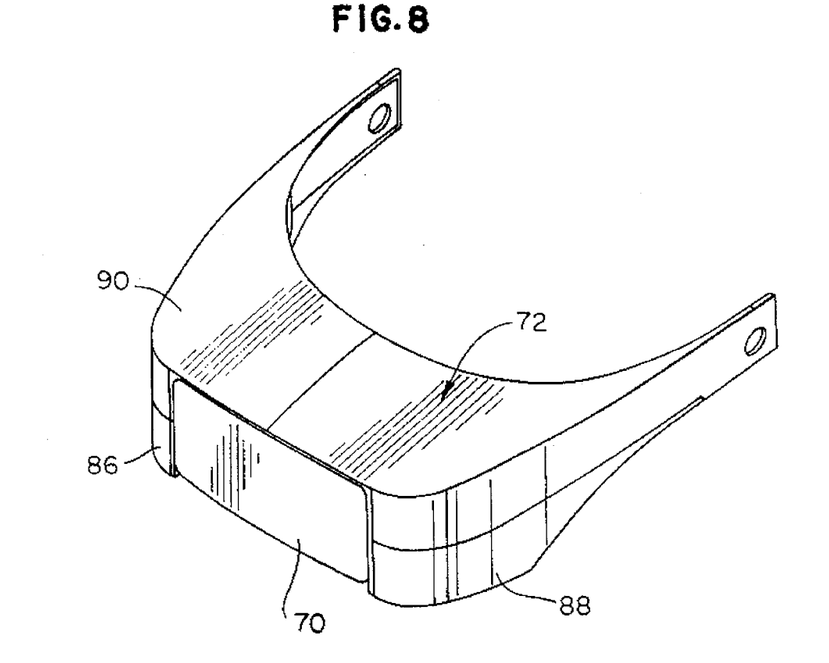
FIG. 8 is a front perspective view of a head mounted display system in accordance with the present invention utilizing a different support to mount the system on a user's head.
Figure 9:
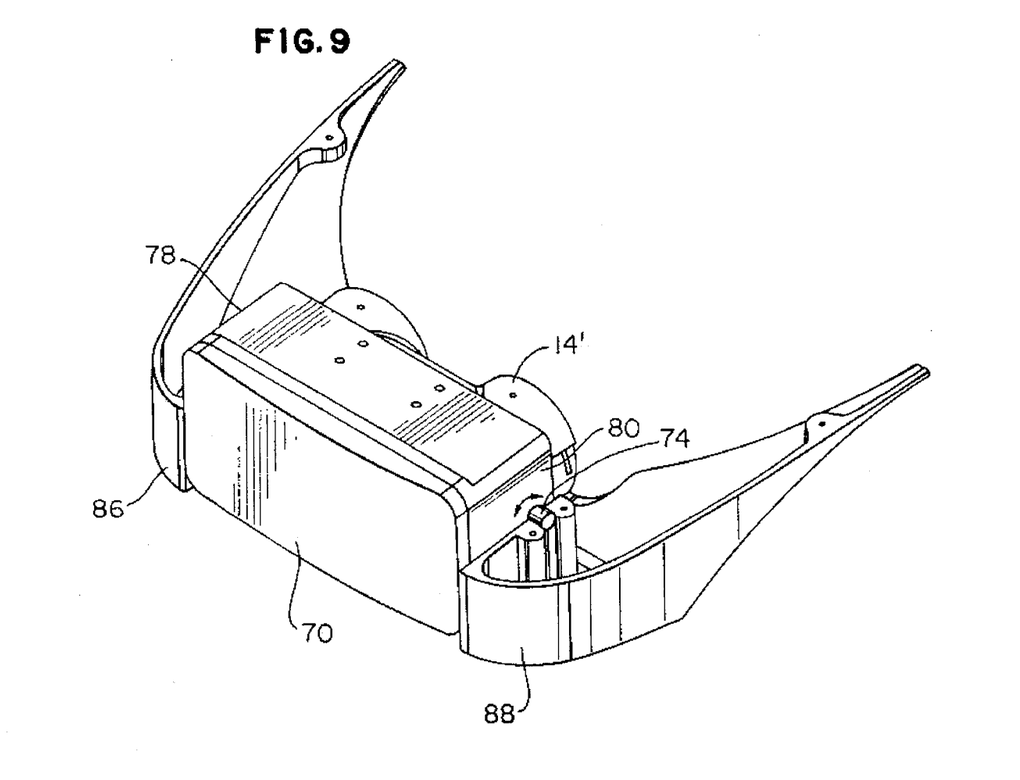
FIG. 9 is a partial front perspective view of the head mounted display system shown in FIG. 8.
Figure 10:
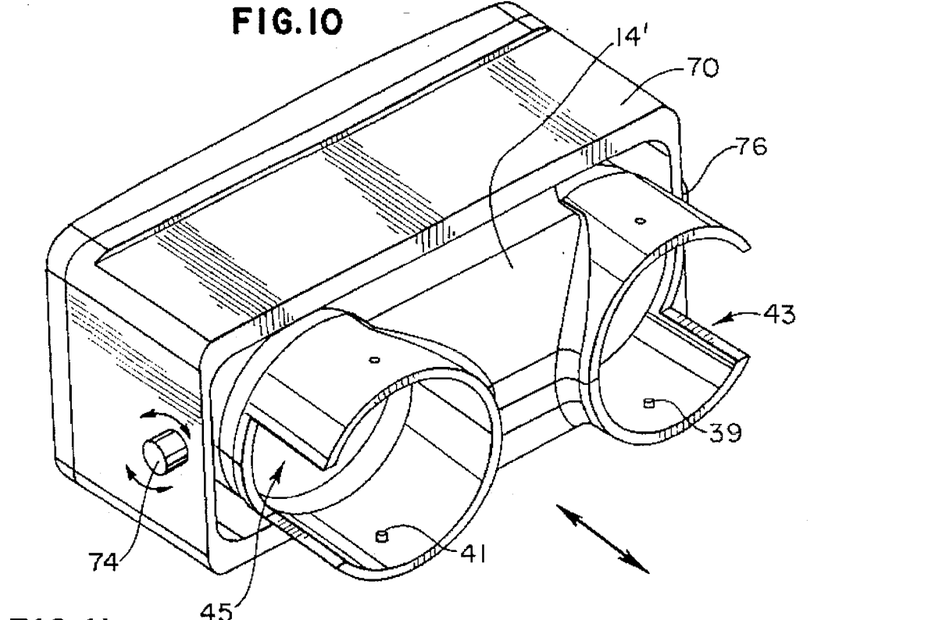
FIG. 10 is a back perspective view of a rotatable mounting and a laterally moveable mounting for the lens and display pairs of the system of FIG. 8.
Figure 11:
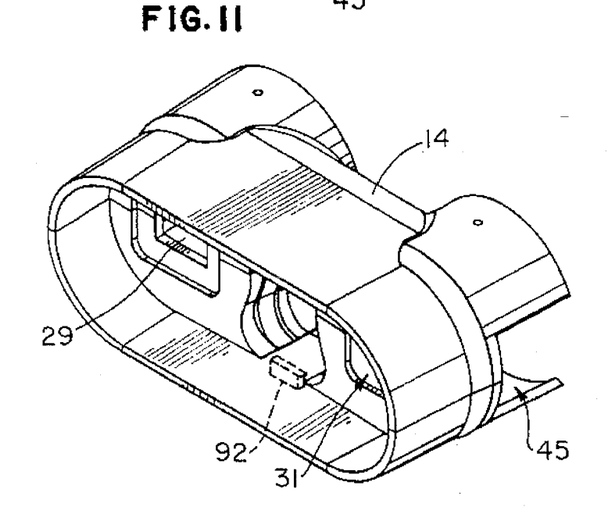
FIG. 11 is a back perspective view of the laterally moveable mounting for the lens and display pairs of the system of FIG. 8.

Each of the aspheric lenses 20 and 22, as shown in FIG. 6 includes a surface shaped with a number of concentric zones I, II and III so as to map a flat displayed video image onto the complex curvature of the user's retina so that the virtual image appears without distortions therein. The inner-zone I is substantially spherical and primarily controls the distance from the user at which the virtual image appears, i.e., the focal length of the lens 20, 22. A mid-zone II is flatter in radius than the inner-zone I and minimizes variations in magnification and field of curvature across the virtual image. An outer-zone III is shaped so as to minimize distortions in the edges of the virtual image so that the edges appear straight and each edge appears to be at right angles with respect to its adjacent edge. In order to shape the aspheric surface of each lens 20, 22 so as to provide the inner, mid and outer-zones, each lens 20, 22 is designed in accordance with the following equation:

$$Y = F(x) = \frac{CX^2}{1 + \sqrt{1 - C^2 cc X^2}} + A2X^2 + A4X^4 + A6X^6$$

where X represents sag and Y describes the surface of the asphere as a function of X as shown in FIGS. 7A and 7B. In the above equation, R represents the central radius of curvature of the lens 20, 22 and C is equal to 1/R. R and C are the predominant factors which characterize the inner-zone I. The constant, cc, which represents the conic constant is the predominant factor controlling the surface of the aspheric lens in the mid-zone II; whereas the constants A2, A4 and A6 are the predominant factors in controlling the curvature in the outer-zone III.

Each of the aspheric lenses 20, 22 may be formed as a biasphere having an aspheric entrance surface adjacent the display and an aspheric exit surface adjacent the user's eye. Each aspheric lens 20, 22 may be formed of a single, optically transmissive material with an index of refraction of approximately 1.49 although materials with other indices of refraction may be used as well. It is noted that as the index of refraction of the material increases, the radius of curvature of the aspheric surface(s) flattens. Alternatively, each aspheric lens 20, 22 may be formed of at least two materials having different indices of refraction so as to form an achromat to compensate for chromatic aberrations. For a biaspheric lens with 2X magnification, the constants for the above-identified equation which describe the entrance surface of the lens are as follows:

R=27 mm–32 mm; cc=−1.0–+2.0;

A2=−0.01–+0.01; A4=+0.00005—−0.00005;

and A6 may be set to zero. The constants of the above equation for the exit surface of such a biaspheric lens with 2X magnification are as follows:

R=48 mm–55.5 mm; cc=+1.0—−3.5;

A2=−0.01–+0.01; A4=+0.00005—−0.00005; and A6 may be set to zero. With each aspheric lens 20 and 22 formed as such and with a display having a width of 20 mm or 0.78 inches, the image through one of the lenses focused at 10 feet from the user appears to be approximately 5 feet wide with an approximate field of view of 30°.

For a biaspheric lens of 1X magnification, the constants describing the entrance surface of the lens are as follows:

R=18.0 mm–13.6 mm; cc=+1.0—−3.0;

A2=−0.01–+0.01; A4=+0.00005—−0.00005; and A6 may be set to zero. The constants describing the exit surface of the lens for 1X magnification are as follows:

R=22.0–30; cc=−1.5–+1.5;

A2=−0.01–+0.01; A4=+0.00005—−0.00005; and A6 may be set to zero. With each aspheric lens 20 and 22 formed as such and with a display having a width of 20 mm or 0.78 inches, the image through one of the lenses focused at 10 feet from the user appears to be approximately 10 feet wide with an approximate field of view of 50°.

Further, for a biaspheric lens of 0.85X magnification, the constants describing the entrance surface of the lens are as follows:

R=11.4 mm–13 mm; cc=−4.0–+1.0;

A2=−0.0002–+0.0002; A4=+0.00002—−0.00002;

and A6=−0.0000005—+0.0000005. The constants for the exit surface of a biaspheric lens with 0.85X magnification are as follows:

R=15 mm–20 mm; cc=−4–0;

A2=−0.001—+0.001; A4=+0.00002—0.00002 and A6 =−0.0000001—+0.0000001. With each aspheric lens 20 and 22 formed as such and with a display having a width of 20 mm or 0.78 inches, the image through one of the lenses focused at 10 feet from the user appears to be approximately 15 feet wide with a field of view of 73°.

It is noted that for each of the above examples, an equivalent lens 20, 22 may be formed by decreasing the power of one surface and increasing the power of the opposite surface. Further, although not necessary, it is preferred that the entrance surface of the lens 20, 22 is formed with more power than the exit surface.

The use of a single aspheric lens 20, 22 in each optical path of the system allows the head mounted display unit 10 to be very lightweight and compact. For example, the distance from the cover 15 to a back 60 of the support 14 representing the thickness of the optical system is merely 2 inches. Even though the optical system is small and compact, the virtual image seen by a user is substantially without distortions therein across the entire width of the image.

Each of the lenses 20, 22 is mounted in a respective lens holder 28, 30 that is movably mounted on the support 14 in a respective, generally cylindrical aperture 32, 34. Protrusions 38 and 39 are positioned opposite to each other on the inner surface of the wall defining the aperture 32. The protrusions 38 and 39 engage a helical groove 36 formed about the outer cylindrical surface of the lens holder 36 so that as the lens holder 36 is rotated in the aperture 32, the pins 38 and 39 engaging the groove 28 move the lens 20 closer to the display 24 or farther therefrom while maintaining the central axis of the lens 20 perpendicular to the face 25 of the display 24 such that the display face 25 is generally parallel to the aspheric lens 20. An aperture 43 is formed in the wall of the support 14 adjacent the lens holder 28 so that a user can manually engage the lens holder 28 to rotate the lens 20.

Similarly, protrusions 40 and 41 are positioned opposite to each other on the inner surface of the wall defining the aperture 34. The protrusions 40 and 41 engage a helical groove 37 formed about the outer cylindrical surface of the lens holder 30 so that as the lens holder 30 is rotated in the aperture 34, the pins 40 and 41 engaging the groove 37 move the lens 22 closer to the display 26 or farther therefrom while maintaining the central axis of the lens 22 perpendicular to the face 27 of the display 26 such that the display face 27 is generally parallel to the aspheric lens 22. An aperture 45 is formed in the wall of the support 14 adjacent the lens holder 30 so that a user can manually engage the lens holder 30 to rotate the lens 22.

Figure 5:
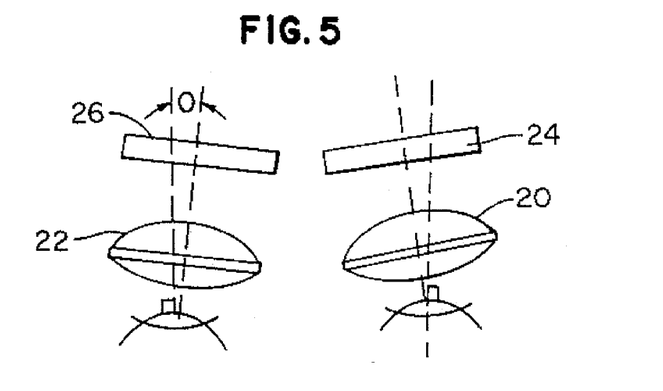
FIG. 5 is a schematic illustration of the orientation of the displays and optics of the system shown in FIG. 1 relative to a user's eye.

For a head mounted display system in which the virtual image is to be projected at a distance that is less than infinity from the user, the cylindrical apertures 32 and 34 of the support 14 are formed therein such that the axes of the apertures 32, 34 are converging towards the displays. Therefore, if the central axis of each of the lenses 20, 22 extends from the center of the lens 20, 22 to the center of the respective display 24, 26, the centers of the displays 24 and 26 will be closer than the centers of the aspheric lenses 20 and 22 as shown in FIG. 5. This convergence angle 8 is small, so as to direct a user's eye inward from the axis of the eye when looking straight ahead. The user's eyes are directed inward at a natural angle to the location of the virtual image at a distance that is less than infinity from the user. For example, for a virtual image that is to appear two-ten feet from the user, a convergence angle of approximately 2°–4° is desired.

Figure 1:
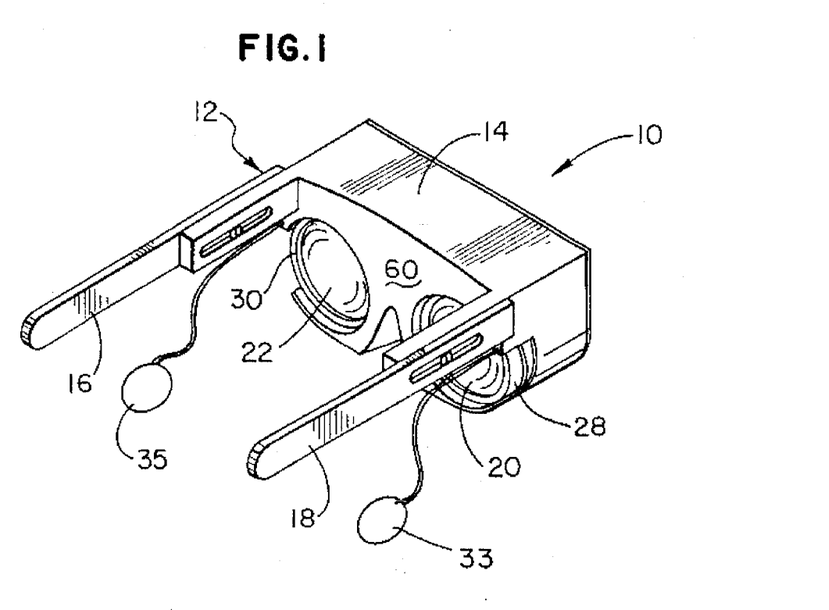
FIG. 1 is a perspective back view of the head mounted display system in accordance with the present invention.
Figure 2:
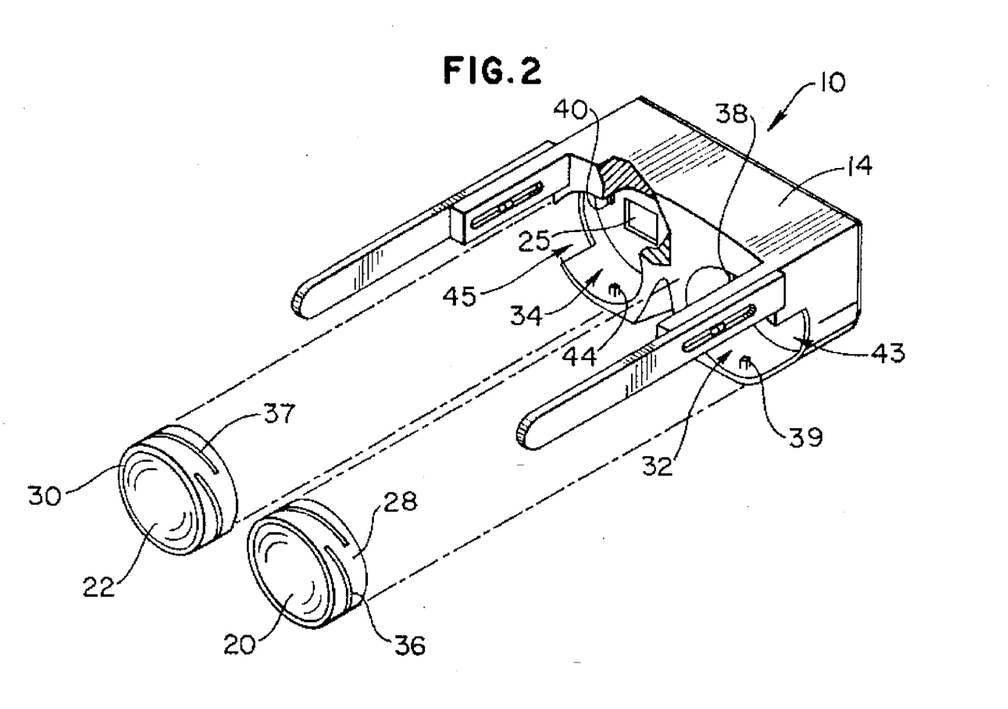
FIG. 2 is an exploded, perspective back view of the head mounted display system depicted in FIG. 1.
Figure 3:
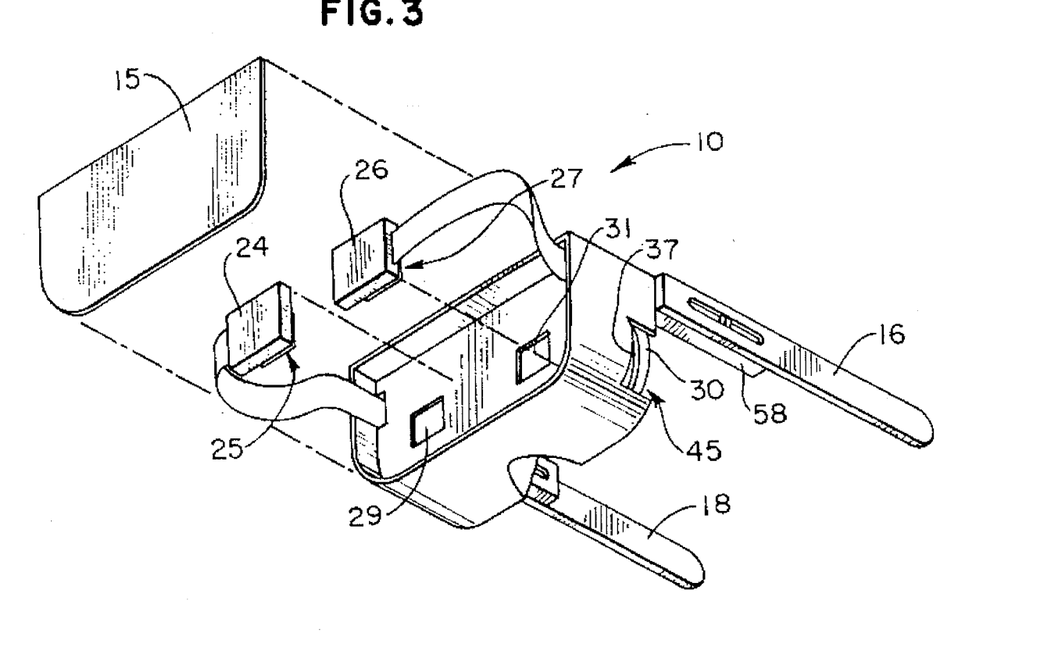
FIG. 3 is an exploded front perspective front view of the head mounted display system of FIG. 1.
Figure 4:
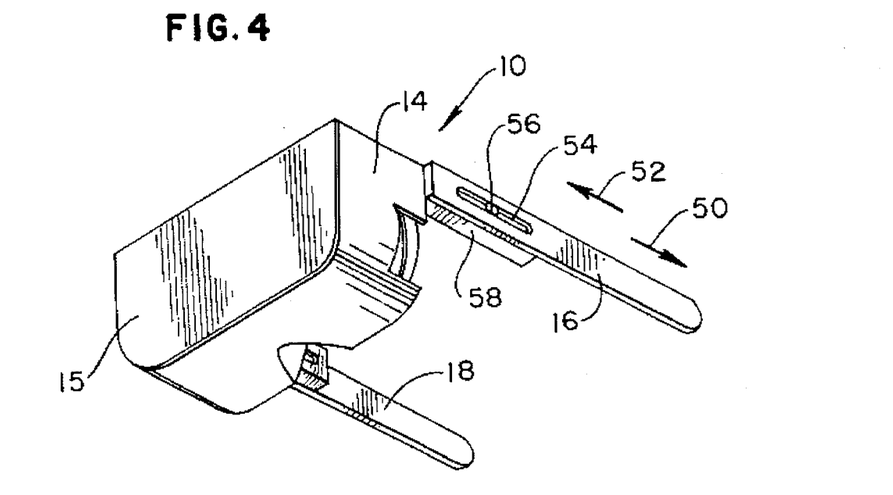
FIG. 4 is a front perspective view of the head mounted display system of FIG. 1.

The head mounted display system 10 of the present invention accommodates users having various interpupillary distances by allowing the support 14 for the optical system to be moved as an integral unit closer to the user's eyes in a direction 50 or farther away therefrom in a direction 52 as depicted in FIG. 4. In order to accomplish this adjustable movement of the support 14, each of the temples 16 and 18 is formed with a respective slot 54 through which a screw 56 extends so that the screw 56 can be screwed into a threaded aperture in the outer surface of a flange 58 of the support 14. By sliding the temple 18 in the direction of the arrows 50 or 52 and tightening the screw 56, the support 14 may be moved towards or away from the user's face to vary the distance between the optical system and the user's eyes to thereby correct for the user's individual interpupillary distance.

It is noted that because each of the aspheric lenses 20, 22 is also independently movable with respect to the displays 24 and 26, the lenses may be individually moved towards or away from the displays so as to accommodate for refractive error in each of the user's eyes for users that are near-sighted or far-sighted. Thus, the head mounted display system of the present invention may be worn by a user who normally wears corrective eyewear, without that eyewear.

FIGS. 8–11 illustrate another embodiment of the frame for a slightly modified support 14' of the optical system that allows the support 14' to be rotated as well as to be moved along a linear path towards and away from the user's eyes. More particularly, the support 14' is formed without the flanges 58 depicted in FIGS. 1–4. Instead, the support 14' is slidably mounted in a housing 70 that is in turn rotatably mounted on a frame 72. When the frame 72 is worn on a user's head, the frame 72 may be positioned such that the lenses 20 and 22 as well as the respective displays 24 and 26 are positioned directly in front of the user's eyes. Alternatively, the frame 72 may be worn higher on the user's head so that the user looks slightly up to view the virtual image. In order to allow the user to look up into the lenses 20, 22, generally along the central axes thereof, the housing 70 is rotatable in the frame 72 so that the user can align his eyes with the central axis of the respective lenses 20, 22. It is noted that even if the frame 72 is worn such that the lenses 20, 22 are positioned directly in front of the user's eyes, the housing 70 may be rotated on the frame 72 slightly so as to accommodate various users and to allow them to easily align the central axis of each lens 20, 22 with their eyes.

In order to allow the housing 70 and thus the support 14' with lenses 20, 22 and displays 24, 26 to rotate, the housing 70 is formed with a cylindrical protrusion 74 and 76 extending from opposite sides 78 and 80 of the housing 70. The protrusions 74 and 76 extend into respective apertures 82 formed in the frame 72 so that the protrusions can rotate therein. The lower portion of each aperture 82 is formed in a respective bottom cover 86 and 88 of the frame 72 whereas the upper portion of each aperture is formed in a top cover 90 of the frame 72.

The support 14' is slidably mounted in the housing 70 so that the optical system can be moved as an integral unit closer to or farther away from the user's eyes in order to accommodate users having various interpupillary distances as discussed above. In order to aid the user in sliding the support 14' the support may include a finger tab 92 (shown in phantom in FIG. 11), a pull or other type of manually engageable extension, that extends slightly downwardly from the support, preferably from a central area on the bottom of the support 14'. When the support 14' is mounted on the housing 70, the tab 92 extends through a slot formed in the bottom wall of the housing 70 so that a user can engage the tab 92 to slide the tab along the slot to thereby slide the support 14' along a linear path relative to the housing 70. With the support 14' housing 70 and frame 72, each of the lenses 20, 22 is moveably mounted in the support 14' as discussed above with respect to the support 14, the support 14' is moveable along a linear path with respect to the housing 70 and thus with respect to the user's eyes; and the housing 70, support 14' and lens-display pairs are rotatable about an axis extending through the protrusions 74 and 76. The head mounted display system 10 of the present invention is thus adjustable so as to accommodate various users and to accommodate various positions on a user's head.

Figure 12:
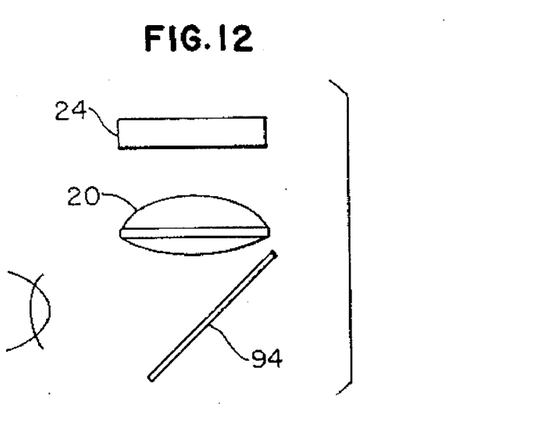
FIG. 12 is a schematic illustration of an alternative embodiment of the optical system utilizing an aspheric lens in accordance with the present invention.

It is noted that the optical system described above may be made so as to see through by merely rotating each aspheric lens and display pair ninety degrees relative to the user's eye and adding in each optical path a partial reflector, such as a semi-reflective mirror, at a forty five degree angle with respect to the user's eye and the face of the respective lens. Such a system is illustrated in FIG. 12 for the aspheric lens 20-display 24 pair and a reflector 94. Other variations may also be made in the system without departing from the scope of the invention. For example, although a binocular head mounted display system is shown and described herein in detail, a number of the features of the present invention are not limited to a binocular system, but are applicable to a head mounted display unit that is monocular as well. Further, although the binocular head mounted display system shown utilizes two separate displays, one in association with each of the aspheric lenses, the aspheric lenses taught above may be used in any system for mapping a flat displayed image onto the complex curvature of the user's retina so as to provide a virtual image with minimal distortions therein. Many other modifications and variations of the present invention may be made. Thus, it is to be understood, that, within the scope of the appended claims, the invention may be practiced otherwise than described herein above.

What is claimed and desired to be secured by Letters Patent is:

1. A binocular head mounted display system comprising:
   a support to mount the display system on a user's head;
   a right-eye aspheric lens mounted on said support so as to be positioned in front of a user's right eye and at a convergence angle with respect to said user's right eye to direct said eye inward;
   a right-eye display for depicting video information mounted on said support at a distance from said right-eye lens with the face of said display generally parallel to said right-eye lens such that the user views an image of the video from the right-eye display through the right-eye lens with the user's right eye directed inward by said convergence angle, said right-eye aspheric lens providing an enlarged image of the video information from said right-eye display with minimal distortions therein;
   a left-eye aspheric lens mounted on said support so as to be positioned in front of a user's left eye and at a convergence angle with respect to said user's left eye to direct said eye inward; and
   a left-eye display for depicting video information mounted on said support at a distance from said left-eye lens with the face of said display generally parallel to said left-eye lens such that the user views an image of the video from the left-eye display through the left-eye lens with the user's left eye directed inward by said convergence angle, said left-eye aspheric lens providing an enlarged image of the video from said left-eye display with minimal distortions therein.

2. A binocular head mounted display system as recited in claim 1 further including means for independently varying the distance between said right-eye lens and display and the distance between said left-eye lens and display while maintaining the face of each display generally parallel to its respective lens.

3. A binocular head mounted display system as recited in claim 2 wherein each of said displays is fixedly mounted on said support and each of said lenses is movably mounted on said support to vary the distance between the lens and the respective display.

4. A binocular head mounted display system as recited in claim 1 further including means for moving said support with respect to the user's face to allow a user to vary the distance between the user's eyes and respective lenses.

5. A binocular head mounted display system as recited in claim 1 wherein said displays are stereoscopic displays.

6. A binocular head mounted display system comprising:
   a support to mount the display system on a user's head;
   a right-eye lens mounted on said support so as to be positioned in front of a user's right eye and at a convergence angle with respect to said user's right eye to direct said eye inward;
   a right-eye display for depicting video information mounted on said support at a distance from said right-eye lens with the face of said display generally parallel to said right-eye lens such that the user views an image of said video from the right-eye display through the right-eye lens with the user's right eye directed inward by said convergence angle;
   a left-eye lens mounted on said support so as to be positioned in front of a user's left eye and at a convergence angle with respect to said user's left eye to direct said eye inward;
   a left-eye display for depicting video information mounted on said support at a distance from said left-eye lens with the face of said display generally parallel to said left-eye lens such that the user views an image of the video from the left-eye display through the left-eye lens with the user's left eye directed inward by said convergence angle; and
   a mounting fixture for mounting said right and left eye lenses and said right and left eye displays on said support such that said lenses and displays are movable together along a linear path generally parallel to an axis extending through one of said lenses and the user's respective eye to vary the position of the lenses and displays relative to the user's eyes without altering the position of the right-eye lens relative to the right-eye display and the position of the left-eye lens relative to the left-eye display.

7. A binocular head mounted display system as recited in claim 6 wherein the distance between said right-eye lens and display and the distance between said left-eye lens and display are independently variable while maintaining the face of each display generally parallel to its respective lens.

8. A binocular head mounted display system as recited in claim 7 wherein each of said displays is fixedly mounted on said support and each of said lenses is movably mounted on said support to vary the distance between the lens and the respective display.

9. A binocular head mounted display system as recited in claim 6 wherein said lens is biconvex.

10. A binocular head mounted display system as recited in claim 6 wherein said lens is an achromat.

11. A head mounted display system comprising:
   a support to mount the display system on a user's head;
   an image source mounted on said support for providing video information in a flat image plane; and
   an aspheric lens mounted on said support relative to said image source for providing an enlarged image of said video projected at a distance form the user, said aspheric lens having a surface shaped with a plurality of concentric zones including an inner-zone for substantially controlling the distance from the user at which a virtual image appears and a zone located outside of said inner-zone for minimizing distortions across said virtual image so as to map the flat video image onto the complex curvature of the user's retina.

12. A head mounted display system as recited in claim 11 wherein said aspheric lens is biaspheric including an aspheric entrance surface and an aspheric exit surface.

13. A head mounted display system as recited in claim 11 wherein said aspheric lens is formed of at least two materials having different indices of refraction so as to form an achromat to compensate for chromatic aberrations.

14. A head mounted display system as recited in claim 11 wherein said image source is a display having a face on which said video is depicted, said aspheric lens and display being mounted on said support generally parallel to each other and at a convergence angle with respect to a user's eye so as to direct the user's eye inward to view the virtual image.

15. A head mounted display system comprising:
   a support to mount the display system on a user's head;
   a right-eye image source mounted on said support for providing video information;
   a right-eye aspheric lens mounted on said support relative to said right-eye image source for providing an enlarged image of the video from said right-eye source projected at a distance form the user, said right-eye aspheric lens having a surface shaped with a plurality of concentric zones including an inner-zone for substantially controlling the distance from the user at which a virtual image appears and a zone located outside of said inner-zone form minimizing distortions across said virtual image;
   a left-eye image source mounted on said support for providing video information; and
   a left-eye aspheric lens mounted on said support relative to said left-eye image source for providing an enlarged image of said video from said left-eye source projected at a distance from the user, said left-eye aspheric lens having a surface shaped with a plurality of concentric zones including an inner-zone for substantially controlling the distance from the user at which said virtual image appears and a zone located outside of said inner-zone for minimizing distortions across said virtual image.

16. A head mounted display system as recited in claim 15 wherein each of said aspheric lenses is biaspheric including an aspheric entrance surface and an aspheric exit surface.

17. A head mounted display system as recited in claim 15 wherein each of said aspheric lenses is formed as an achromat to compensate for chromatic aberrations.

18. A head mounted display system as recited in claim 15 wherein each of said image sources is a display having a face on which said video is depicted, each aspheric lens and display pair being mounted on said support such that the lens of the pair is generally parallel to the display of the pair and at a convergence angle with respect to a user's eye so as to direct the user's eyes inward to view a virtual image.

19. A head mounted display system comprising:
   a support to mount the display system on a user's head;
   an image source mounted on said support for providing video information; and
   an aspheric lens mounted on said support relative to said image source for providing an enlarged image of said video projected at a distance from the user, said aspheric lens having a surface shaped with a plurality of concentric zones including an inner-zone for substantially controlling the distance from the user at which a virtual image appears, a mid-zone for minimizing variations in magnification across said virtual image and an outer-zone for minimizing distortions in the edges of said virtual image.

20. A head mounted display system as recited in claim 19 wherein said aspheric lens is biaspheric including an aspheric entrance surface and an aspheric exit surface.

21. A head mounted display system as recited in claim 19 wherein said aspheric lens is an achromat to compensate for chromatic aberrations.

22. A head mounted display system as recited in claim 19 wherein said image source is a display having a face on which said video is depicted, said aspheric lens and display being mounted on said support generally parallel to each other and at a convergence angle with respect to a user's eye so as to direct the user's eye inward to view the image.

23. A head mounted display system as recited in claim 19 wherein said inner-zone is substantially spherical.

24. A head mounted display system as recited in claim 23 wherein said mid-zone is flatter than said inner-zone.

25. A head mounted display system as recited in claim 24 wherein said outer-zone is more curved than said mid-zone.

26. A head mounted display system as recited in claim 19 wherein said lens is biaspheric with more power in an entrance surface of said lens adjacent to said display than the power in an exit surface of the lens adjacent to the user's eyes.

27. A head mounted display system as recited in claim 19 wherein the support for said lens and image source has a thickness from a front surface to a back surface that is less than approximately 2 inches.

28. A head mounted display system comprising:
   a support to mount the display system on a user's head;
   an image source mounted on said support for providing video information; and
   an aspheric lens mounted on said support relative to said image source such that said video information is directed to a user's eye through said aspheric lens, said aspheric lens providing an enlarged image of the video information, said aspheric lens having a surface shaped with a plurality of concentric zones including an inner zone for substantially controlling the distance from the user at which said image appears, a mid-zone for minimizing variations in magnification across a virtual image and an outer zone for minimizing distortion in the edges of said virtual image.

29. A head mounted display system as recited in claim 28 including a reflector mounted on said support relative to said aspheric lens to allow said user to view said image through said reflector.

30. A head mounted display system as recited in claim 29 wherein said reflector is partially reflective.

31. A head mounted display system as recited in claim 29 wherein said reflector is fully reflective.

32. A head mounted display system as recited in claim 28 wherein said aspheric lens is positioned between said image source and a user's eye to allow the user to view through said aspheric lens said enlarged image.

33. A head mounted display system as recited in claim 28 herein said head mounted display system is a binocular system and further includes a second aspheric lens mounted on said support relative to said image source such that said video information is directed to the user's other eye through said second aspheric lens.

34. A head mounted display system as recited in claim 33 wherein said image source includes a first display and a second display.

35. A head mounted display system as recited in claim 28 wherein the distance between said aspheric lens and said image source is variable.

36. A head mounted display system as recited in claim 28 wherein the distance between said aspheric lens and a user's eye is variable when said support is mounted on the user's head.

37. A head mounted display system as recited in claim 28 wherein said aspheric lens and image source are mounted on said support so as to be rotatable together to vary the position of the aspheric lens and the image source relative to the user's eye without altering the position of the aspheric lens relative to said image source.

38. A head mounted display system comprising:

a support to mount the display system on a user's head;

an image source mounted on said support for providing video information;

an aspheric lens mounted on said support relative to said image source such that said video information is directed to a user's eye through said aspheric lens, said aspheric lens providing an enlarged image of the video information;

means for mounting said aspheric lens on said support such that said aspheric lens and image source are movable together along a linear path generally parallel to an axis extending through said lens and the user's eye and are rotatable together about an axis of rotation to vary the position of the aspheric lens and the image source relative to the user's eye without altering the position of the aspheric lens relative to the image source; and means for varying the distance between said aspheric lens and said image source.

* * * * *